United States Patent
Li et al.

(10) Patent No.: US 11,947,552 B2
(45) Date of Patent: Apr. 2, 2024

(54) METHOD FOR DISCOVERING CAUSALITY FROM DATA, ELECTRONIC DEVICE AND STORAGE MEDIUM

(71) Applicant: BEIJING BAIDU NETCOM SCIENCE TECHNOLOGY CO., LTD., Beijing (CN)

(72) Inventors: Xu Li, Beijing (CN); Yunfeng Cai, Beijing (CN); Mingming Sun, Beijing (CN); Ping Li, Sunnyvale, CA (US)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/947,659

(22) Filed: Sep. 19, 2022

(65) Prior Publication Data

US 2023/0273932 A1    Aug. 31, 2023

(30) Foreign Application Priority Data

Feb. 25, 2022   (CN) .......................... 202210177580.6

(51) Int. Cl.
*G06F 17/00* (2019.01)
*G06F 16/22* (2019.01)
*G06F 16/2458* (2019.01)

(52) U.S. Cl.
CPC ...... *G06F 16/2465* (2019.01); *G06F 16/2237* (2019.01)

(58) Field of Classification Search
CPC ............. G06F 16/2465; G06F 16/2237; G06F 16/2455; G06F 16/248; G06N 5/00; G06N 5/046; G06N 7/00; G06N 20/00
See application file for complete search history.

(56) References Cited

U.S. PATENT DOCUMENTS 11,537,910 B2 * 12/2022 Wei .......................... G06F 17/18
11,651,234 B2 *  5/2023 Liu ...................... G06F 16/9024
                                                                706/52
(Continued)

OTHER PUBLICATIONS

Jonas Peters, Joris M. Mooij, Dominik Janzing, and Bernhard Scholkopf. Causal discovery with continuous additive noise models. J. Mach. Learn. Res. 15, 1, 2009-2053.Jan. 2014.*

(Continued)

*Primary Examiner* — Greta L Robinson
(74) *Attorney, Agent, or Firm* — Brooks Kushman P.C.

(57) ABSTRACT

A method for discovering causality from data includes acquiring to-be-processed data, and obtaining a covariance matrix of the to-be-processed data; determining a first target column in the covariance matrix, taking the number of columns of the first target column as a first place in a rearrangement sequence, and obtaining a first upper triangular matrix according to the first target column; determining a position of the number of columns of the covariance matrix other than the first target column except the first place in the rearrangement sequence according to the first target column and the first upper triangular matrix, and obtaining an upper triangular matrix in each position determination; obtaining an adjacency matrix according to an upper triangular matrix and a rearrangement sequence obtained in final position determination; and generating directed acyclic graph (DAG) by using the adjacency matrix, and taking the DAG as causality discovery result of the to-be-processed data.

20 Claims, 3 Drawing Sheets

(56) References Cited

U.S. PATENT DOCUMENTS

2020/0167694 A1\* 5/2020 Pisner .................... G06N 5/022
2022/0004910 A1\* 1/2022 Wei ........................ G06N 20/10
2022/0027770 A1\* 1/2022 Pan ........................ G06N 20/00

OTHER PUBLICATIONS

Zhenxing Wang et al., An efficient causal discovery algorithm for linear models. In Proceedings of the 16th ACM SIGKDD international conference on Knowledge discovery and data mining, Association for Computing Machinery, 1109-1118, <https://doi.org/10.1145/1835804.1835944>, Jul. 2010.\*

\* cited by examiner

METHOD FOR DISCOVERING CAUSALITY FROM DATA, ELECTRONIC DEVICE AND STORAGE MEDIUM

CROSS-REFERENCE TO RELATED APPLICATIONS

The present application claims the priority of Chinese Patent Application No. 202210177580.6, filed on Feb. 25, 2022, with the title of "METHOD AND APPARATUS FOR DISCOVERING CAUSALITY FROM DATA." The disclosure of the above application is incorporated herein by reference in its entirety.

FIELD OF THE DISCLOSURE

The present disclosure relates to the technical field of computers, particularly to the technical field of artificial intelligence such as deep learning, knowledge graphs, and cloud services. A method for discovering causality from data, an electronic device, and a readable storage medium are provided.

BACKGROUND OF THE DISCLOSURE

Discovery of causality from data has attracted the attention of many researchers and research institutions, and has been widely used in many technical fields.

The problem of discovering causality from data is generally approached by looking for a directed acyclic graph (DAG). The DAG includes a plurality of nodes and edges between the nodes. If an edge exists between two nodes, it indicates that causality exists between the two nodes.

However, in the related art, when a DAG of corresponding data is generated generally by using a search-based algorithm, a continuous optimization algorithm, a reinforcement learning method or a topological sorting method, technical problems such as low accuracy and slow generation of the generated DAG arise.

SUMMARY OF THE DISCLOSURE

According to a first aspect of the present disclosure, a method for discovering causality from data is provided, including: acquiring to-be-processed data, and obtaining a covariance matrix of the to-be-processed data; determining a first target column in the covariance matrix, taking the number of columns of the first target column as a first place in a rearrangement sequence, and obtaining a first upper triangular matrix according to the first target column; determining a position of the number of columns of the covariance matrix other than the first target column except the first place in the rearrangement sequence according to the first target column and the first upper triangular matrix, and obtaining an upper triangular matrix in each position determination; obtaining an adjacency matrix according to an upper triangular matrix and a rearrangement sequence obtained in final position determination; and generating a DAG by using the adjacency matrix, and taking the DAG as a causality discovery result of the to-be-processed data.

According to a second aspect of the present disclosure, there is provided an electronic device, including: at least one processor; and a memory communicatively connected with the at least one processor; wherein the memory stores instructions executable by the at least one processor, and the instructions are executed by the at least one processor to enable the at least one processor to perform a method for discovering causality from data, wherein the method includes: acquiring to-be-processed data, and obtaining a covariance matrix of the to-be-processed data; determining a first target column in the covariance matrix, taking the number of columns of the first target column as a first place in a rearrangement sequence, and obtaining a first upper triangular matrix according to the first target column; determining a position of the number of columns of the covariance matrix other than the first target column except the first place in the rearrangement sequence according to the first target column and the first upper triangular matrix, and obtaining an upper triangular matrix in each position determination; obtaining an adjacency matrix according to an upper triangular matrix and a rearrangement sequence obtained in final position determination; and generating a DAG by using the adjacency matrix, and taking the DAG as a causality discovery result of the to-be-processed data.

According to a third aspect of the present disclosure, there is provided a non-transitory computer readable storage medium with computer instructions stored thereon, wherein the computer instructions are used for causing a method for discovering causality from data, wherein the method includes: acquiring to-be-processed data, and obtaining a covariance matrix of the to-be-processed data; determining a first target column in the covariance matrix, taking the number of columns of the first target column as a first place in a rearrangement sequence, and obtaining a first upper triangular matrix according to the first target column; determining a position of the number of columns of the covariance matrix other than the first target column except the first place in the rearrangement sequence according to the first target column and the first upper triangular matrix, and obtaining an upper triangular matrix in each position determination; obtaining an adjacency matrix according to an upper triangular matrix and a rearrangement sequence obtained in final position determination; and generating a directed acyclic graph (DAG) by using the adjacency matrix, and taking the DAG as a causality discovery result of the to-be-processed data.

It should be understood that the content described in this part is neither intended to identify key or significant features of the embodiments of the present disclosure, nor intended to limit the scope of the present disclosure. Other features of the present disclosure will be made easier to understand through the following description.

BRIEF DESCRIPTION OF DRAWINGS

The accompanying drawings are intended to provide a better understanding of the solutions and do not constitute a limitation on the present disclosure. In the drawings.

DETAILED DESCRIPTION OF PREFERRED EMBODIMENTS

Exemplary embodiments of the present disclosure are illustrated below with reference to the accompanying drawings, which include various details of the present disclosure to facilitate understanding and should be considered only as exemplary. Therefore, those of ordinary skill in the art should be aware that various changes and modifications can be made to the embodiments described herein without departing from the scope and spirit of the present disclosure. Similarly, for clarity and simplicity, descriptions of well-known functions and structures are omitted in the following description.

Figure 1:
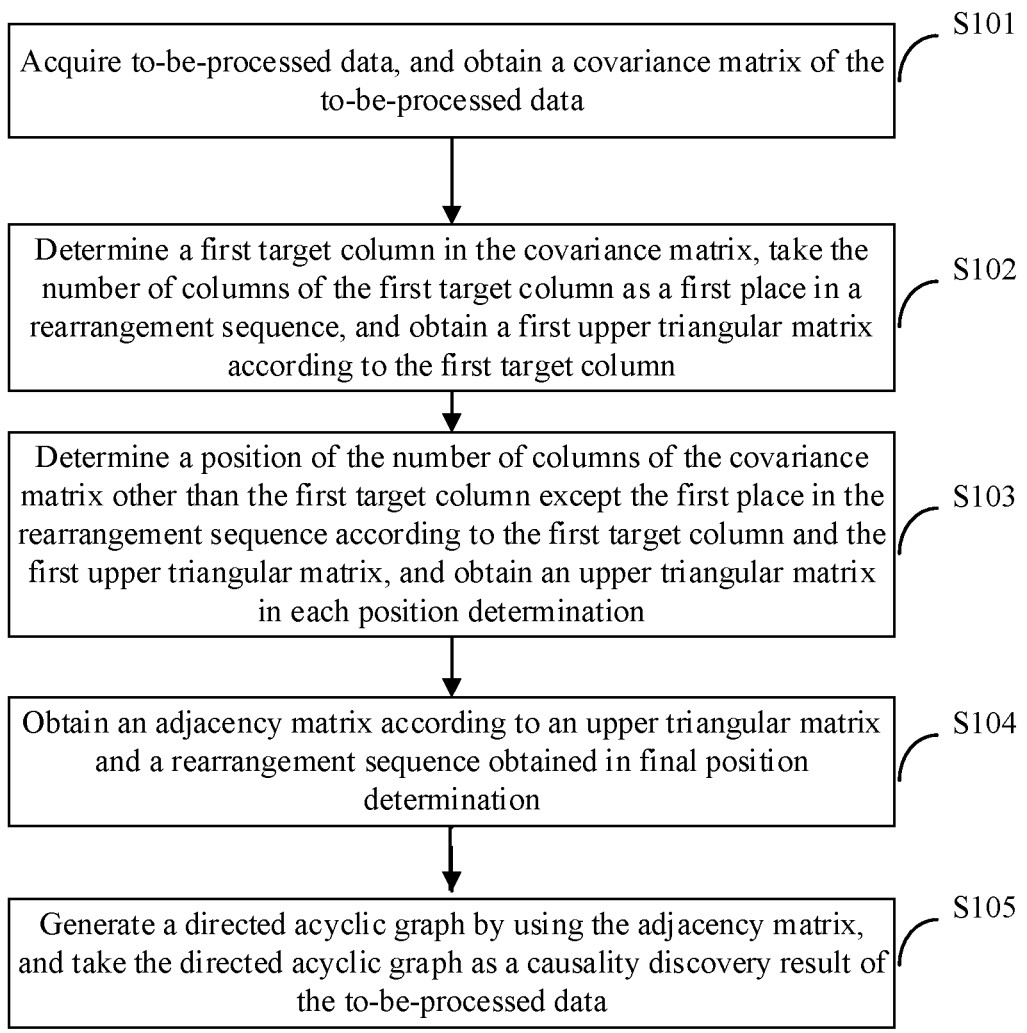
FIG. 1 is a schematic diagram according to a first embodiment of the present disclosure.

FIG. 1 is a schematic diagram according to a first embodiment of the present disclosure. As shown in FIG. 1, a method for discovering causality from data according to this embodiment specifically includes the following steps.

In S101, to-be-processed data is acquired, and a covariance matrix of the to-be-processed data is obtained.

In S102, a first target column in the covariance matrix is determined, the number of columns of the first target column is taken as a first place in a rearrangement sequence, and a first upper triangular matrix is obtained according to the first target column.

In S103, a position of the number of columns of the covariance matrix other than the first target column except the first place in the rearrangement sequence is determined according to the first target column and the first upper triangular matrix, and an upper triangular matrix in each position determination is obtained.

In S104, an adjacency matrix is obtained according to an upper triangular matrix and a rearrangement sequence obtained in final position determination.

In S105, a DAG is generated by using the adjacency matrix, and the DAG is taken as a causality discovery result of the to-be-processed data.

According to the method for discovering causality from data in this embodiment, after to-be-processed data is acquired and a covariance matrix of the to-be-processed data is obtained, an operation of determining a position of the number of columns in the covariance matrix in a rearrangement sequence and obtaining an upper triangular matrix in each position determination is performed, so as to obtain an adjacency matrix according to an upper triangular matrix and a rearrangement sequence obtained in final position determination, and a DAG generated by using the adjacency matrix is taken as a causality discovery result of the to-be-processed data. This embodiment can effectively improve accuracy and efficiency in the discovery of causality from data.

In this embodiment, when S101 is performed to acquire to-be-processed data, data inputted from an input end may be taken as the to-be-processed data, or data selected from a network by an input end may be taken as the to-be-processed data. In this embodiment, the to-be-processed data acquired by performing S101 corresponds to a preset field. The preset field may be one of biology, machine learning, economics, and pharmacy.

In this embodiment, a data format of the to-be-processed data acquired by performing S101 is an nxp matrix, where n denotes an amount of sample data (i.e., rows in the matrix), and p denotes a dimension of each piece of sample data (i.e., columns in the matrix).

For example, in this embodiment, the to-be-processed data acquired by performing S101 may be body data corresponding to different users. If the included users are a user A and a user B, the body data of the user A includes a height value 1, a value 1, and a blood type 1, and the body data of the user B includes a height value 2, a weight value 2, and a blood type 2, that is, the mount n of sample data is 2, and the dimension p of each piece of sample data is 3, the data format of the to-be-processed data acquired by performing S101 is a 2×3 matrix, which is specifically (height value 1, weight value 1, blood type 1; height 2, weight value 2, blood type 2).

In this embodiment, after S101 is performed to acquire to-be-processed data, a covariance matrix corresponding to the acquired to-be-processed data can be obtained. In this embodiment, the covariance matrix of the to-be-processed data is obtained by calculating covariance between data of different dimensions in the to-be-processed data (i.e., each column in a matrix of the to-be-processed data). In this embodiment, an existing function, such as a coy function, can be used to obtain the covariance matrix of the to-be-processed data.

In this embodiment, after S101 is performed to obtain a covariance matrix of the to-be-processed data, S102 is performed to determine a first target column in the covariance matrix, take the number of columns of the first target column as a first place in a rearrangement sequence, and obtain a first upper triangular matrix according to the first target column.

Specifically, in this embodiment, when S102 is performed to determine a first target column in the covariance matrix, an available optional implementation involves: determining a minimum value located on a diagonal line of the covariance matrix; and taking a column where the minimum value is located as the first target column in the covariance matrix.

That is, in this embodiment, a column where a minimum diagonal element is located in the covariance matrix is taken as the first target column. Diagonal elements in the covariance matrix are variance of dimensions, and the smaller the variance is, the smaller a dispersion degree of the data in the column is. Therefore, this embodiment can improve accuracy of the determined first target column.

In this embodiment, after S102 is performed to determine a first target column in the covariance matrix, the rearrangement sequence is updated according to the determined first target column. Specifically, the number of columns of the determined first target column in the covariance matrix is taken as a first place in the rearrangement sequence.

For example, if the covariance matrix includes 5 columns, an initial rearrangement sequence includes the number of columns of the corresponding covariance matrix, that is, (1, 2, 3, 4, 5). If, in this embodiment, the first target column determined by performing S102 is a fourth column in the covariance matrix, the fourth column is taken as the first place in the rearrangement sequence, and an updated rearrangement sequence is (4, 1, 2, 3, 5).

In this embodiment, the first upper triangular matrix obtained by performing S102 is an upper triangular matrix in the determination of the first place in the rearrangement sequence. The determined first upper triangular matrix is a 1×1 matrix.

In this embodiment, when S102 is performed to obtain a first upper triangular matrix according to the first target column, calculation may be performed according to the number of samples in the to-be-processed data, the first target column in the covariance matrix, and a first preset parameter, so as to take a calculation result as the first upper triangular matrix.

In this embodiment, when S102 is performed, the first upper triangular matrix may be obtained by using the following formula:

$$U_1 = \sqrt{\frac{n}{\|X_{:,i_L}\|^2 + \lambda}}$$

In the formula, $U_1$ denotes the first upper triangular matrix; n denotes an amount of sample data in the to-be-processed data;

$$X_{:,i_l}$$

denotes the first target column in the covariance matrix; and λ denotes the first preset parameter.

In this embodiment, when S102 is performed, the first preset parameter used may be a preset parameter or obtained according to the to-be-processed data acquired by performing S101 in this embodiment.

In this embodiment, when S102 is performed, the first present parameter may be obtained by using the following formula:

$$\lambda = \frac{\gamma \log p}{n} R$$

In the formula, λ denotes the first preset parameter; γ denotes a preset adjustment parameter; p denotes a dimension of each piece of sample data in the to-be-processed data; n denotes an amount of sample data in the to-be-processed data; and R denotes a maximum modulus of sample data of different dimensions in the to-be-processed data.

Through experiments, it is found that, when the first preset parameter calculated by using the above formula is used to obtain the upper triangular matrix in this embodiment, a relatively accurate DAG can still be obtained when the to-be-processed data acquired includes a small amount of sample data.

In this embodiment, after S102 is performed to determine a first target column, determine a first place in the rearrangement sequence according to the first target column, and obtain a first upper triangular matrix, S103 is performed to determine a position of the number of columns of the covariance matrix other than the first target column except the first place in the rearrangement sequence according to the first target column and the first upper triangular matrix, and obtain an upper triangular matrix in each position determination.

Specifically, in this embodiment, when S103 is performed to determine a position of the number of columns of the covariance matrix other than the first target column except the first place in the rearrangement sequence according to the first target column and the first upper triangular matrix, and obtain an upper triangular matrix in each position determination, an available optional implementation involves: taking, for a second place in the rearrangement sequence, columns in the covariance matrix other than the first target column as candidate second target columns; obtaining a plurality of target calculation results according to the first upper triangular matrix and the candidate second target columns, and taking the candidate second target column corresponding to the target calculation result in the plurality of target calculation results that satisfies a preset requirement as a second target column; taking the number of columns of the second target column in the covariance matrix as the second place in the rearrangement sequence, and obtaining a second upper triangular matrix according to the first upper triangular matrix and the second target column; taking, for a third place in the rearrangement sequence, columns in the covariance matrix other than the first target column and the second target column as candidate third target columns; obtaining a plurality of target calculation results according to the second upper triangular matrix and the candidate third target columns, and taking the candidate third target column corresponding to the target calculation result in the plurality of target calculation results that satisfies a preset requirement as a third target column; taking the number of columns of the third target column in the covariance matrix as the third place in the rearrangement sequence, and obtaining a third upper triangular matrix according to the second upper triangular matrix and the third target column; and continuously proceeding until the last place in the rearrangement sequence is determined.

That is, in this embodiment, target columns at different positions in the rearrangement sequence are sequentially determined on a round-robin basis. When the last place in the rearrangement sequence is determined, an upper triangular matrix in the determination of the last place may also be obtained, so as to acquire a causality discovery result of the to-be-processed data according to the obtained upper triangular matrix, which can simplify the step of determining the upper triangular matrix and improve efficiency and accuracy in the determination of the upper triangular matrix.

In this embodiment, when S103 is performed to obtain a target calculation result according to a previous upper triangular matrix and a current candidate target column, an available optional implementation involves: obtaining a first calculation result according to the previous upper triangular matrix, a previous target column in the covariance matrix, and the current candidate target column in the covariance matrix; and obtaining the target calculation result according to the first calculation result.

In this embodiment, when S103 is performed to obtain a first calculation result according to the previous upper triangular matrix, a previous target column in the covariance matrix, and the current candidate target column in the covariance matrix, the following formula may be used for calculation:

$$y_j = \frac{1}{n} U_{k-1}^T X_{:,i_{k-1}}^T X_{:,i_j}$$

In the formula, $y_j$ denotes the first calculation result; n denotes an amount of sample data in the to-be-processed data; $U_{k-1}^T$ denotes transpose of the previous upper triangular matrix;

$$X_{:,i_{k-1}}^T$$

denotes transpose of the previous target column in the covariance matrix; and $$X_{:,i_j}$$

denotes the current candidate target column in the covariance matrix.

In this embodiment, when S103 is performed to obtain the target calculation result according to the obtained first calculation result, the obtained first calculation result may be directly taken as the target calculation result.

In order to further improve the accuracy of the obtained target calculation result, in this embodiment, when S103 is performed to obtain the target calculation result according to the obtained first calculation result, an available optional implementation involves: obtaining a second calculation result according to the current candidate target columns in the covariance matrix, the first calculation result, and the first preset parameter; and taking at least one of the first calculation result and the second calculation result as the target calculation result.

In this embodiment, when S103 is performed to obtain a second calculation result according to the current candidate target column in the covariance matrix, the first calculation result, and the first preset parameter, the following formula may be used for calculation:

$$\alpha_j = \sqrt{\frac{1}{n}\|X_{:,i_j}\|^2 + \lambda - \|y_j\|^2}$$

In the formula, $\alpha_j$ denotes the second calculation result; n denotes an amount of sample data in the to-be-processed data;

$$X_{:,i_j}$$

denotes the current candidate target column in the covariance matrix; $\lambda$ denotes the first preset parameter, of which the acquisition process has been described hereinabove; and $y_j$ denotes the first calculation result.

In this embodiment, when S103 is performed to determine the target result in the plurality of target results that satisfies a preset requirement, the preset requirement used is preset. Whether the preset requirement is satisfied may be determined only according to the first calculation result, or only according to the second calculation result, or according to both the first calculation result and the second calculation result.

In this embodiment, the preset requirement used to perform S103 may include a first preset requirement, a second preset requirement, and a third preset requirement. The first preset requirement may be arg $\min_{k \leq j \leq p} \alpha_j^2$. That is, whether the preset requirement is satisfied may be determined only according to the second calculation result. The second preset requirement may be arg $\min_{k \leq j \leq p} \|U_{k-1}y_j\|_1$. That is, whether the preset requirement is satisfied may be determined only according to the first calculation result. The third preset requirement may be arg min $$_{k \leq j \leq p} \|U_{k-1}y_j\|_1 \sqrt{\left|\alpha_j^2 - \frac{1}{k}\sum_{h=1}^{k-1}\frac{1}{[U_{k-1}]_{hh}^2}\right|}.$$

That is, whether the preset requirement is satisfied may be determined according to both the first calculation result and the second calculation result.

In addition, in this embodiment, when S103 is performed to obtain a current upper triangular matrix according to a previous upper triangular matrix and a current target column, the following formula may be used for calculation:

$$U_k = \begin{bmatrix} U_{k-1} & -\frac{1}{\alpha_l}U_{k-1}y_l \\ 0 & \frac{1}{\alpha_l} \end{bmatrix}$$

In the formula, $U_k$ denotes the current upper triangular matrix; $U_{k-1}$ denotes the previous upper triangular matrix; $\alpha_l$ denotes a second calculation result of the current target column; and $y_l$ denotes a first calculation result of the current target column.

It may be understood that, in this embodiment, the number of rows and the number of columns in the upper triangular matrix corresponding to each place obtained by performing S103 are correlated with a current place. If the current place is the second place, a second upper triangular matrix obtained is a 2×2 matrix. If the current place is the third place, a third upper triangular matrix obtained is a 3×3 matrix.

In this embodiment, after S103 is performed to determine a position of the number of columns of the covariance matrix other than the first target column except the first place in the rearrangement sequence, and obtain an upper triangular matrix in each position determination, S104 is performed to obtain an adjacency matrix according to an upper triangular matrix and a rearrangement sequence obtained in final position determination.

Specifically, in this embodiment, when S104 is performed to obtain an adjacency matrix according to an upper triangular matrix and a rearrangement sequence obtained in final position determination, an available optional implementation involves: removing diagonal elements from the obtained upper triangular matrix to obtain a strictly upper triangular matrix; and restoring an order of columns in the strictly upper triangular matrix to an initial order according to the rearrangement sequence, and obtaining the adjacency matrix. In this embodiment, the initial order is an order of columns in the covariance matrix.

For example, if, in this embodiment, the strictly upper triangular matrix obtained by performing S104 is a 3×3 matrix, if the rearrangement sequence obtained is (2, 3, 1) and the initial order is (1, 2, 3), the first column in the strictly upper triangular matrix is taken as the second column of the adjacency matrix, the second column in the strictly upper triangular matrix is taken as the third column of the adjacency matrix, and the third column in the strictly upper triangular matrix is taken as the first column of the adjacency matrix.

In addition, in order to further improve the accuracy of the obtained adjacency matrix, in this embodiment, when S104 is performed to remove diagonal elements from the obtained upper triangular matrix to obtain a strictly upper triangular matrix, an available optional implementation involves: filtering, by using a preset threshold, elements in the upper triangular matrix with the diagonal elements removed, that is, retaining elements in the upper triangular matrix that are greater than the preset threshold, and setting elements less than the preset threshold to 0; and taking an upper triangular matrix obtained after the elements are filtered as the strictly upper triangular matrix.

In this embodiment, after S104 is performed to obtain an adjacency matrix, S105 is performed to generate a DAG by using the adjacency matrix, and take the DAG as a causality discovery result of the to-be-processed data.

In this embodiment, the DAG generated by performing S105 includes a plurality of nodes and directed edges between the nodes. If an edge exists between two nodes in the DAG, it indicates that causality exists between the two nodes. A pointed node is a child node, and a pointing node is a parent node of the child node.

It may be understood that, in this embodiment, when S105 is performed, the adjacency matrix may be restored through a known algorithm, so as to obtain the corresponding DAG.

Figure 2:
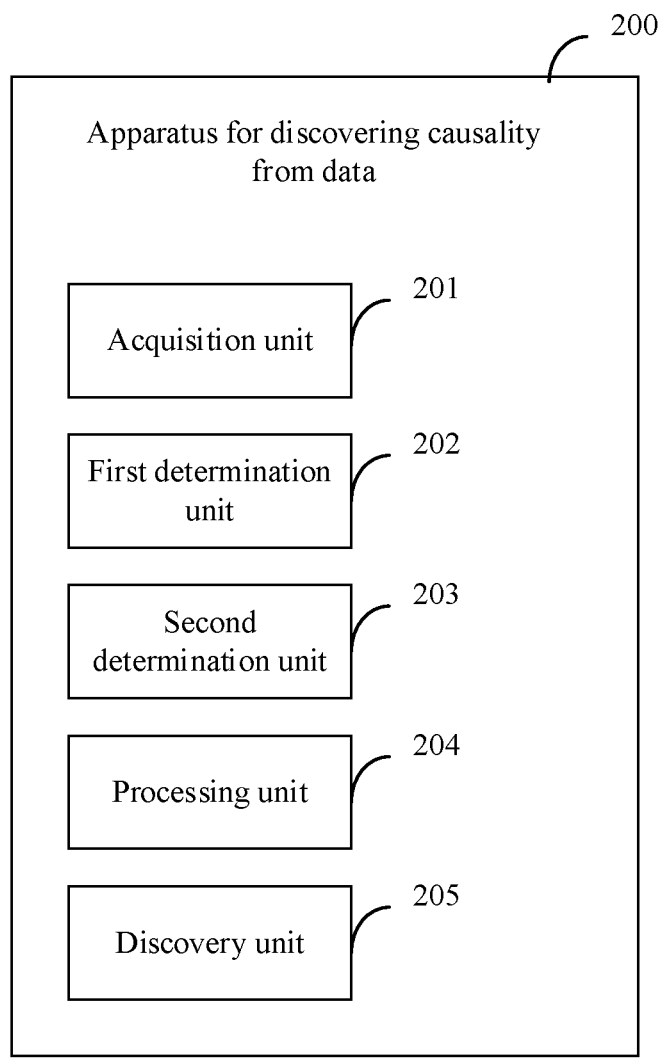
FIG. 2 is a schematic diagram according to a second embodiment of the present disclosure.

FIG. 2 is a schematic diagram according to a second embodiment of the present disclosure. As shown in FIG. 2, an apparatus 200 for discovering causality from data according to this embodiment includes an acquisition unit 201 configured to acquire to-be-processed data, and obtaining a covariance matrix of the to-be-processed data; a first determination unit 202 configured to determine a first target column in the covariance matrix, taking the number of columns of the first target column as a first place in a rearrangement sequence, and obtain a first upper triangular matrix according to the first target column; a second determination unit 203 configured to determine a position of the number of columns of the covariance matrix other than the first target column except the first place in the rearrangement sequence according to the first target column and the first upper triangular matrix, and obtain an upper triangular matrix in each position determination; a processing unit 204 configured to obtain an adjacency matrix according to an upper triangular matrix and a rearrangement sequence obtained in final position determination; and a discovery unit 205 configured to generate a DAG by using the adjacency matrix, and take the DAG as a causality discovery result of the to-be-processed data.

When acquiring to-be-processed data, the acquisition unit 201 may take data inputted from an input end as the to-be-processed data, or take data selected from a network by an input end as the to-be-processed data. In this embodiment, the to-be-processed data acquired by the acquisition unit 201 corresponds to a preset field. The preset field may be one of biology, machine learning, economics, and pharmacy.

A data format of the to-be-processed data acquired by the acquisition unit 201 is an nxp matrix, where n denotes an amount of sample data (i.e., rows in the matrix), and p denotes a dimension of each piece of sample data (i.e., columns in the matrix).

After the acquisition unit 201 acquires to-be-processed data, a covariance matrix corresponding to the acquired to-be-processed data can be obtained. The acquisition unit 201 obtains the covariance matrix of the to-be-processed data by calculating covariance between data of different dimensions in the to-be-processed data (i.e., each column in a matrix of the to-be-processed data). In this embodiment, an existing function, such as a coy function, can be used to obtain the covariance matrix of the to-be-processed data.

In this embodiment, after the acquisition unit 201 obtains the covariance matrix of the to-be-processed data, the first determination unit 202 determines a first target column in the covariance matrix, takes the number of columns of the first target column as a first place in a rearrangement sequence, and obtains a first upper triangular matrix according to the first target column.

Specifically, when the first determination unit 202 determines a first target column in the obtained covariance matrix, an available optional implementation involves: determining a minimum value located on a diagonal line of the covariance matrix; and taking a column where the minimum value is located as the first target column in the covariance matrix.

That is, the first determination unit 202 takes a column where a minimum diagonal element is located in the covariance matrix as the first target column. Diagonal elements in the covariance matrix are variance of dimensions, and the smaller the variance is, the smaller a dispersion degree of the data in the column is. Therefore, this embodiment can improve accuracy of the determined first target column.

After the first determination unit 202 determines a first target column in the covariance matrix, the rearrangement sequence is updated according to the determined first target column. Specifically, the number of columns of the determined first target column in the covariance matrix is taken as a first place in the rearrangement sequence.

The first upper triangular matrix obtained by the first determination unit 202 is an upper triangular matrix in the determination of the first place in the rearrangement sequence. The determined first upper triangular matrix is a 1×1 matrix.

When the first determination unit 202 obtains a first upper triangular matrix according to the first target column, calculation may be performed according to the number of samples in the to-be-processed data, the first target column in the covariance matrix, and a first preset parameter, so as to take a calculation result as the first upper triangular matrix.

The first preset parameter used by the first determination unit 202 may be a preset parameter or obtained according to the to-be-processed data acquired by the acquisition unit 201.

In this embodiment, after the first determination unit 202 determines a first target column, determines a first place in the rearrangement sequence according to the first target column, and obtains a first upper triangular matrix, the second determination unit 203 determines a position of the number of columns of the covariance matrix other than the first target column except the first place in the rearrangement sequence according to the first target column and the first upper triangular matrix, and obtains an upper triangular matrix in each position determination.

Specifically, when the second determination unit 203 determines a position of the number of columns of the covariance matrix other than the first target column except the first place in the rearrangement sequence according to the first target column and the first upper triangular matrix, and obtains an upper triangular matrix in each position determination, an available optional implementation involves: taking, for a second place in the rearrangement sequence, columns in the covariance matrix other than the first target column as candidate second target columns; obtaining a plurality of target calculation results according to the first upper triangular matrix and the candidate second target columns, and taking the candidate second target column corresponding to the target calculation result in the plurality of target calculation results that satisfies a preset requirement as a second target column; taking the number of columns of the second target column in the covariance matrix as the second place in the rearrangement sequence, and obtaining a second upper triangular matrix according to the first upper triangular matrix and the second target column; taking, for a third place in the rearrangement sequence, columns in the covariance matrix other than the first target column and the second target column as candidate third target columns; obtaining a plurality of target calculation results according to the second upper triangular matrix and the candidate third target columns, and taking the candidate third target column corresponding to the target calculation result in the plurality of target calculation results that satisfies a preset requirement as a third target column; taking the number of columns of the third target column in the covariance matrix as the third place in the rearrangement sequence, and obtaining a third upper triangular matrix according to the second upper triangular matrix and the third target column; and continuously proceeding until the last place in the rearrangement sequence is determined.

That is, the second determination unit 203 sequentially determines target columns at different positions in the rearrangement sequence on a round-robin basis. When the last place in the rearrangement sequence is determined, an upper triangular matrix in the determination of the last place may also be obtained, so as to acquire a causality discovery result of the to-be-processed data according to the obtained upper triangular matrix, which can simplify the step of determining the upper triangular matrix and improve efficiency and accuracy in the determination of the upper triangular matrix.

When the second determination unit 203 obtains a target calculation result according to a previous upper triangular matrix and a current candidate target column, an available optional implementation involves: obtaining a first calculation result according to the previous upper triangular matrix, a previous target column in the covariance matrix, and the current candidate target column in the covariance matrix; and obtaining the target calculation result according to the first calculation result.

When the second determination unit 203 obtains the target calculation result according to the obtained first calculation result, the obtained first calculation result may be directly taken as the target calculation result.

In order to further improve the accuracy of the obtained target calculation result, when the second determination unit 203 obtains the target calculation result according to the obtained first calculation result, an available optional implementation involves: obtaining a second calculation result according to the current candidate target columns in the covariance matrix, the first calculation result, and the first preset parameter; and taking at least one of the first calculation result and the second calculation result as the target calculation result.

When the second determination unit 203 determines the target result in the plurality of target results that satisfies a preset requirement, the preset requirement used is preset. Whether the preset requirement is satisfied may be determined only according to the first calculation result, or only according to the second calculation result, or according to both the first calculation result and the second calculation result.

In addition, when the second determination unit 203 obtains a current upper triangular matrix according to a previous upper triangular matrix and a current target column, the following formula may be used for calculation:

$$U_k = \begin{bmatrix} U_{k-1} & -\frac{1}{\alpha_l} U_{k-1} y_l \\ 0 & \frac{1}{\alpha_l} \end{bmatrix}$$

In the formula, $U_k$ denotes the current upper triangular matrix; $U_{k-1}$ denotes the previous upper triangular matrix; $\alpha_l$ denotes a second calculation result of the current target column; and $y_l$ denotes a first calculation result of the current target column.

It may be understood that, the number of rows and the number of columns in the upper triangular matrix corresponding to each place obtained by the second determination unit 203 are correlated with the current place. If the current place is the second place, a second upper triangular matrix obtained is a 2×2 matrix. If the current place is the third place, a third upper triangular matrix obtained is a 3×3 matrix.

In this embodiment, after the second determination unit 203 determines a position of the number of columns of the covariance matrix other than the first target column except the first place in the rearrangement sequence, and obtains an upper triangular matrix in each position determination, the processing unit 204 obtains an adjacency matrix according to an upper triangular matrix and a rearrangement sequence obtained in final position determination.

Specifically, when the processing unit 204 obtains an adjacency matrix according to an upper triangular matrix and a rearrangement sequence obtained in final position determination, an available optional implementation involves: removing diagonal elements from the obtained upper triangular matrix to obtain a strictly upper triangular matrix; and restoring an order of columns in the strictly upper triangular matrix to an initial order according to the rearrangement sequence, and obtaining the adjacency matrix. In this embodiment, the initial order is an order of columns in the covariance matrix.

In addition, in order to further improve the accuracy of the obtained adjacency matrix, when the processing unit 204 removes diagonal elements from the obtained upper triangular matrix to obtain a strictly upper triangular matrix, an available optional implementation involves: filtering, by using a preset threshold, elements in the upper triangular matrix with the diagonal elements removed; and taking an upper triangular matrix obtained after the elements are filtered as the strictly upper triangular matrix.

In this embodiment, after the processing unit 204 obtains an adjacency matrix, the discovery unit 205 generates a DAG by using the adjacency matrix, and takes the DAG as a causality discovery result of the to-be-processed data.

In this embodiment, the DAG generated by the discovery unit 205 includes a plurality of nodes and directed edges between the nodes. If an edge exists between two nodes in the DAG, it indicates that causality exists between the two nodes. A pointed node is a child node, and a pointing node is a parent node of the child node.

It may be understood that, the discovery unit 205 may restore the adjacency matrix through a known algorithm, so as to obtain the corresponding DAG.

Acquisition, storage, and application of users' personal information involved in the technical solutions of the present disclosure comply with relevant laws and regulations, and do not violate public order and moral.

According to embodiments of the present disclosure, the present disclosure further provides an electronic device, a readable storage medium, and a computer program product.

Figure 3:
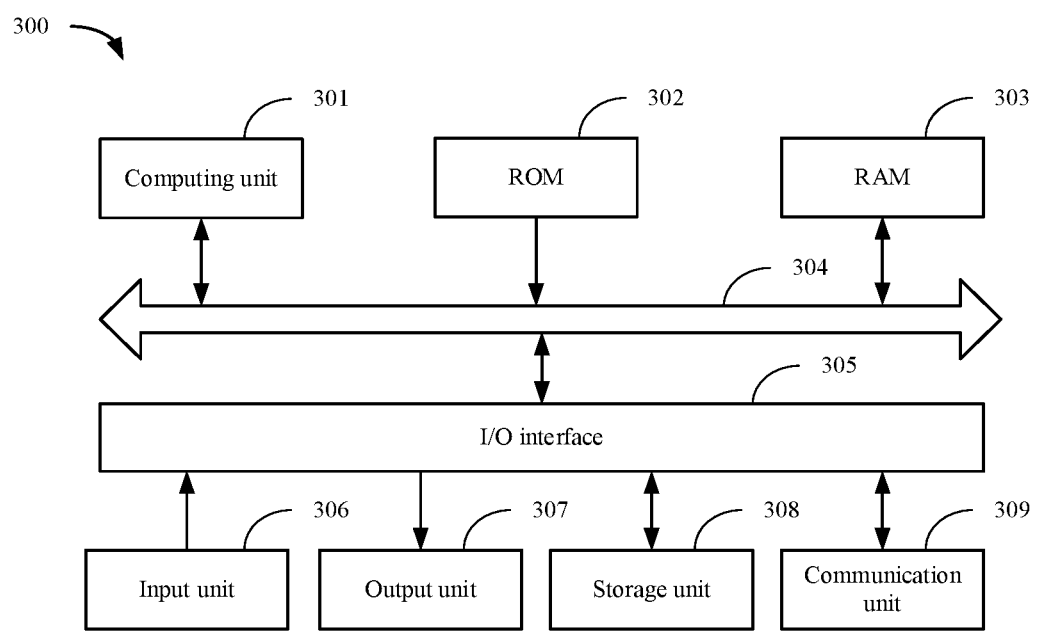
FIG. 3 is a block diagram of an electronic device configured to implement a method for discovering causality from data according to an embodiment of the present disclosure.

FIG. 3 is a block diagram of an electronic device configured to implement the method for discovering causality from data according to an embodiment of the present disclosure. The electronic device is intended to represent various forms of digital computers, such as laptops, desktops, workbenches, personal digital assistants, servers, blade servers, mainframe computers and other suitable computers. The electronic device may further represent various forms of mobile devices, such as personal digital assistants, cellular phones, smart phones, wearable devices and other similar computing devices. The components, their connections and relationships, and their functions shown herein are examples only, and are not intended to limit the implementation of the present disclosure as described and/or required herein.

As shown in FIG. 3, the device 300 includes a computing unit 301, which may perform various suitable actions and processing according to a computer program stored in a read-only memory (ROM) 302 or a computer program loaded from a storage unit 308 into a random access memory (RAM) 303. The RAM 303 may also store various programs and data required to operate the device 300. The computing unit 301, the ROM 302 and the RAM 303 are connected to one another by a bus 304. An input/output (I/O) interface 305 is also connected to the bus 304.

A plurality of components in the device 300 are connected to the I/O interface 305, including an input unit 306, such as a keyboard and a mouse; an output unit 307, such as various displays and speakers; a storage unit 308, such as disks and discs; and a communication unit 309, such as a network card, a modem and a wireless communication transceiver. The communication unit 309 allows the device 300 to exchange information/data with other devices over computer networks such as the Internet and/or various telecommunications networks.

The computing unit 301 may be a variety of general-purpose and/or special-purpose processing components with processing and computing capabilities. Some examples of the computing unit 301 include, but are not limited to, a central processing unit (CPU), a graphics processing unit (GPU), various artificial intelligence (AI) computing chips, various computing units that run machine learning model algorithms, a digital signal processor (DSP), and any appropriate processor, controller or microcontroller, etc. The computing unit 301 performs the methods and processing described above, such as the method for discovering causality from data. For example, in some embodiments, the method for discovering causality from data may be implemented as a computer software program that is tangibly embodied in a machine-readable medium, such as the storage unit 308.

In some embodiments, part or all of a computer program may be loaded and/or installed on the device 300 via the ROM 302 and/or the communication unit 309. One or more steps of the method for discovering causality from data described above may be performed when the computer program is loaded into the RAM 303 and executed by the computing unit 301. Alternatively, in other embodiments, the computing unit 301 may be configured to perform the method for discovering causality from data by any other appropriate means (for example, by means of firmware).

Various implementations of the systems and technologies disclosed herein can be realized in a digital electronic circuit system, an integrated circuit system, a field programmable gate array (FPGA), an application-specific integrated circuit (ASIC), an application-specific standard product (ASSP), a system on chip (SOC), a complex programmable logic device (CPLD), computer hardware, firmware, software, and/or combinations thereof. Such implementations may include implementation in one or more computer programs that are executable and/or interpretable on a programmable system including at least one programmable processor, which can be special or general purpose, configured to receive data and instructions from a storage system, at least one input apparatus, and at least one output apparatus, and to transmit data and instructions to the storage system, the at least one input apparatus, and the at least one output apparatus.

Program codes configured to implement the methods in the present disclosure may be written in any combination of one or more programming languages. Such program codes may be supplied to a processor or controller of a general-purpose computer, a special-purpose computer, or another programmable data processing apparatus to enable the function/operation specified in the flowchart and/or block diagram to be implemented when the program codes are executed by the processor or controller. The program codes may be executed entirely on a machine, partially on a machine, partially on a machine and partially on a remote machine as a stand-alone package, or entirely on a remote machine or a server.

In the context of the present disclosure, machine-readable media may be tangible media which may include or store programs for use by or in conjunction with an instruction execution system, apparatus or device. The machine-readable media may be machine-readable signal media or machine-readable storage media. The machine-readable media may include, but are not limited to, electronic, magnetic, optical, electromagnetic, infrared, or semiconductor systems, apparatuses or devices, or any suitable combinations thereof. More specific examples of machine-readable storage media may include electrical connections based on one or more wires, a portable computer disk, a hard disk, an RAM, an ROM, an erasable programmable read only memory (EPROM or flash memory), an optical fiber, a compact disk read only memory (CD-ROM), an optical storage device, a magnetic storage device, or any suitable combination thereof.

To provide interaction with a user, the systems and technologies described here can be implemented on a computer. The computer has: a display apparatus (e.g., a cathode-ray tube (CRT) or a liquid crystal display (LCD) monitor) for displaying information to the user; and a keyboard and a pointing apparatus (e.g., a mouse or trackball) through which the user may provide input for the computer. Other kinds of apparatuses may also be configured to provide interaction with the user. For example, a feedback provided for the user may be any form of sensory feedback (e.g., visual, auditory, or tactile feedback); and input from the user may be received in any form (including sound input, speech input, or tactile input).

The systems and technologies described herein can be implemented in a computing system including background components (e.g., as a data server), or a computing system including middleware components (e.g., an application server), or a computing system including front-end components (e.g., a user computer with a graphical user interface or web browser through which the user can interact with the implementation mode of the systems and technologies described here), or a computing system including any combination of such background components, middleware components or front-end components. The components of the system can be connected to each other through any form or medium of digital data communication (e.g., a communication network). Examples of the communication network include: a local area network (LAN), a wide area network (WAN), and the Internet.

The computer system may include a client and a server. The client and the server are generally far away from each other and generally interact via the communication network. A relationship between the client and the server is generated through computer programs that run on a corresponding computer and have a client-server relationship with each other. The server may be a cloud server, also known as a cloud computing server or cloud host, which is a host product in the cloud computing service system to solve the problems of difficult management and weak business scalability in the traditional physical host and a virtual private server (VPS). The server may be a cloud server, a distributed system server, or a server combined with blockchain.

It should be understood that the steps can be reordered, added, or deleted using the various forms of processes shown above. For example, the steps described in the present disclosure may be executed in parallel or sequentially or in different sequences, provided that desired results of the technical solutions disclosed in the present disclosure are achieved, which is not limited herein.

The above specific implementations do not limit the protection scope of the present disclosure. Those skilled in the art should understand that various modifications, combinations, sub-combinations, and replacements can be made according to design requirements and other factors. Any modifications, equivalent substitutions and improvements made within the spirit and principle of the present disclosure all should be included in the protection scope of the present disclosure.

What is claimed is:

1. A computer-implemented method for discovering causality from data, comprising:
   acquiring to-be-processed data which is body data corresponding to different users, and obtaining a covariance matrix of the to-be-processed data;
   determining a first target column in the covariance matrix, taking the number of columns of the first target column as a first place in a rearrangement sequence, and obtaining a first upper triangular matrix according to the first target column;
   determining a position of the number of columns of the covariance matrix other than the first target column except the first place in the rearrangement sequence according to the first target column and the first upper triangular matrix, and obtaining an upper triangular matrix in each position determination;
   obtaining an adjacency matrix according to an upper triangular matrix and a rearrangement sequence obtained in final position determination; and
   generating a directed acyclic graph (DAG) by using the adjacency matrix, and taking the DAG as a causality discovery result of the to-be-processed data.

2. The method of claim 1, wherein the determining a first target column in the covariance matrix comprises:
   determining a minimum value located on a diagonal line of the covariance matrix; and
   taking a column where the minimum value is located as the first target column in the covariance matrix.

3. The method of claim 1, wherein the obtaining a first upper triangular matrix according to the first target column comprises:
   performing calculation according to the number of samples in the to-be-processed data, the first target column in the covariance matrix, and a first preset parameter, and taking a calculation result as the first upper triangular matrix.

4. The method of claim 2, wherein the obtaining a first upper triangular matrix according to the first target column comprises:
   performing calculation according to the number of samples in the to-be-processed data, the first target column in the covariance matrix, and a first preset parameter, and taking a calculation result as the first upper triangular matrix.

5. The method of claim 1, wherein the determining a position of the number of columns of the covariance matrix other than the first target column except the first place in the rearrangement sequence according to the first target column and the first upper triangular matrix, and obtaining an upper triangular matrix in each position determination comprises:
   taking, for a second place in the rearrangement sequence, columns in the covariance matrix other than the first target column as candidate second target columns;
   obtaining a plurality of target calculation results according to the first upper triangular matrix and the candidate second target columns, and taking the candidate second target column corresponding to the target calculation result in the plurality of target calculation results that satisfies a preset requirement as a second target column;
   taking the number of columns of the second target column in the covariance matrix as the second place in the rearrangement sequence, and obtaining a second upper triangular matrix according to the first upper triangular matrix and the second target column;
   taking, for a third place in the rearrangement sequence, columns in the covariance matrix other than the first target column and the second target column as candidate third target columns;
   obtaining a plurality of target calculation results according to the second upper triangular matrix and the candidate third target columns, and taking the candidate third target column corresponding to the target calculation result in the plurality of target calculation results that satisfies a preset requirement as a third target column;
   taking the number of columns of the third target column in the covariance matrix as the third place in the rearrangement sequence, and obtaining a third upper triangular matrix according to the second upper triangular matrix and the third target column; and
   continuously proceeding until the last place in the rearrangement sequence is determined.

6. The method of claim 5, wherein obtaining a target calculation result according to a previous upper triangular matrix and a current candidate target column comprises:
   obtaining a first calculation result according to the previous upper triangular matrix, a previous target column in the covariance matrix, and the current candidate target column in the covariance matrix; and
   obtaining the target calculation result according to the first calculation result.

7. The method of claim 6, wherein the obtaining the target calculation result according to the first calculation result comprises:
   obtaining a second calculation result according to the current candidate target column in the covariance matrix, the first calculation result, and the first preset parameter; and
   taking at least one of the first calculation result and the second calculation result as the target calculation result.

8. The method of claim 1, wherein the obtaining an adjacency matrix according to an upper triangular matrix and a rearrangement sequence obtained in final position determination comprises:
   removing diagonal elements from the upper triangular matrix obtained in the final position determination to obtain a strictly upper triangular matrix; and
   restoring an order of columns in the strictly upper triangular matrix to an initial order according to the rearrangement sequence obtained in the final position determination, and obtaining the adjacency matrix.

9. The method of claim 8, wherein the removing diagonal elements from the upper triangular matrix obtained in the final position determination to obtain a strictly upper triangular matrix comprises:
filtering, by using a preset threshold, elements in the upper triangular matrix with the diagonal elements removed; and
taking an upper triangular matrix obtained after the elements are filtered as the strictly upper triangular matrix.

10. The method of claim 2, wherein the determining a position of the number of columns of the covariance matrix other than the first target column except the first place in the rearrangement sequence according to the first target column and the first upper triangular matrix, and obtaining an upper triangular matrix in each position determination comprises:
taking, for a second place in the rearrangement sequence, columns in the covariance matrix other than the first target column as candidate second target columns;
obtaining a plurality of target calculation results according to the first upper triangular matrix and the candidate second target columns, and taking the candidate second target column corresponding to the target calculation result in the plurality of target calculation results that satisfies a preset requirement as a second target column;
taking the number of columns of the second target column in the covariance matrix as the second place in the rearrangement sequence, and obtaining a second upper triangular matrix according to the first upper triangular matrix and the second target column;
taking, for a third place in the rearrangement sequence, columns in the covariance matrix other than the first target column and the second target column as candidate third target columns;
obtaining a plurality of target calculation results according to the second upper triangular matrix and the candidate third target columns, and taking the candidate third target column corresponding to the target calculation result in the plurality of target calculation results that satisfies a preset requirement as a third target column;
taking the number of columns of the third target column in the covariance matrix as the third place in the rearrangement sequence, and obtaining a third upper triangular matrix according to the second upper triangular matrix and the third target column; and
continuously proceeding until the last place in the rearrangement sequence is determined.

11. An electronic device, comprising:
at least one processor; and
a memory communicatively connected with the at least one processor;
wherein the memory stores instructions executable by the at least one processor, and the instructions are executed by the at least one processor to enable the at least one processor to perform a method for discovering causality from data, wherein the method comprises:
acquiring to-be-processed data which is body data corresponding to different users, and obtaining a covariance matrix of the to-be-processed data;
determining a first target column in the covariance matrix, taking the number of columns of the first target column as a first place in a rearrangement sequence, and obtaining a first upper triangular matrix according to the first target column;
determining a position of the number of columns of the covariance matrix other than the first target column except the first place in the rearrangement sequence according to the first target column and the first upper triangular matrix, and obtaining an upper triangular matrix in each position determination;
obtaining an adjacency matrix according to an upper triangular matrix and a rearrangement sequence obtained in final position determination; and
generating a directed acyclic graph (DAG) by using the adjacency matrix, and taking the DAG as a causality discovery result of the to-be-processed data.

12. The electronic device of claim 11, wherein the determining a first target column in the covariance matrix comprises:
determining a minimum value located on a diagonal line of the covariance matrix; and
taking a column where the minimum value is located as the first target column in the covariance matrix.

13. The electronic device of claim 11, wherein the obtaining a first upper triangular matrix according to the first target column comprises:
performing calculation according to the number of samples in the to-be-processed data, the first target column in the covariance matrix, and a first preset parameter, and taking a calculation result as the first upper triangular matrix.

14. The electronic device of claim 12, wherein the obtaining a first upper triangular matrix according to the first target column comprises:
performing calculation according to the number of samples in the to-be-processed data, the first target column in the covariance matrix, and a first preset parameter, and taking a calculation result as the first upper triangular matrix.

15. The electronic device of claim 11, wherein the determining a position of the number of columns of the covariance matrix other than the first target column except the first place in the rearrangement sequence according to the first target column and the first upper triangular matrix, and obtaining an upper triangular matrix in each position determination comprises:
taking, for a second place in the rearrangement sequence, columns in the covariance matrix other than the first target column as candidate second target columns;
obtaining a plurality of target calculation results according to the first upper triangular matrix and the candidate second target columns, and taking the candidate second target column corresponding to the target calculation result in the plurality of target calculation results that satisfies a preset requirement as a second target column;
taking the number of columns of the second target column in the covariance matrix as the second place in the rearrangement sequence, and obtaining a second upper triangular matrix according to the first upper triangular matrix and the second target column;
taking, for a third place in the rearrangement sequence, columns in the covariance matrix other than the first target column and the second target column as candidate third target columns;
obtaining a plurality of target calculation results according to the second upper triangular matrix and the candidate third target columns, and taking the candidate third target column corresponding to the target calculation result in the plurality of target calculation results that satisfies a preset requirement as a third target column;

taking the number of columns of the third target column in the covariance matrix as the third place in the rearrangement sequence, and obtaining a third upper triangular matrix according to the second upper triangular matrix and the third target column; and continuously proceeding until the last place in the rearrangement sequence is determined.

16. The electronic device of claim 15, wherein obtaining a target calculation result according to a previous upper triangular matrix and a current candidate target column comprises:

obtaining a first calculation result according to the previous upper triangular matrix, a previous target column in the covariance matrix, and the current candidate target column in the covariance matrix; and obtaining the target calculation result according to the first calculation result.

17. The electronic device of claim 16, wherein the obtaining the target calculation result according to the first calculation result comprises:

obtaining a second calculation result according to the current candidate target column in the covariance matrix, the first calculation result, and the first preset parameter; and taking at least one of the first calculation result and the second calculation result as the target calculation result.

18. The electronic device of claim 11, wherein the obtaining an adjacency matrix according to an upper triangular matrix and a rearrangement sequence obtained in final position determination comprise:

removing diagonal elements from the upper triangular matrix obtained in the final position determination to obtain a strictly upper triangular matrix; and restoring an order of columns in the strictly upper triangular matrix to an initial order according to the rearrangement sequence obtained in the final position determination, and obtaining the adjacency matrix.

19. The electronic device of claim 18, wherein the removing diagonal elements from the upper triangular matrix obtained in the final position determination to obtain a strictly upper triangular matrix comprises:

filtering, by using a preset threshold, elements in the upper triangular matrix with the diagonal elements removed; and taking an upper triangular matrix obtained after the elements are filtered as the strictly upper triangular matrix.

20. A non-transitory computer readable storage medium with computer instructions stored thereon, wherein the computer instructions are used for causing a method for discovering causality from data, wherein the method comprises:

acquiring to-be-processed data which is body data corresponding to different users, and obtaining a covariance matrix of the to-be-processed data;

determining a first target column in the covariance matrix, taking the number of columns of the first target column as a first place in a rearrangement sequence, and obtaining a first upper triangular matrix according to the first target column;

determining a position of the number of columns of the covariance matrix other than the first target column except the first place in the rearrangement sequence according to the first target column and the first upper triangular matrix, and obtaining an upper triangular matrix in each position determination;

obtaining an adjacency matrix according to an upper triangular matrix and a rearrangement sequence obtained in final position determination; and generating a directed acyclic graph (DAG) by using the adjacency matrix, and taking the DAG as a causality discovery result of the to-be-processed data.

* * * * *